(12) United States Patent
Rong et al.

(10) Patent No.: US 10,991,343 B2
(45) Date of Patent: Apr. 27, 2021

(54) AUTOMATIC IMAGE ALIGNMENT WITH HEAD MOUNTED DISPLAY OPTICS

(71) Applicant: Facebook Technologies, LLC, Menlo Park, CA (US)

(72) Inventors: Wei Rong, San Jose, CA (US); Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/532,308

(22) Filed: Aug. 5, 2019

(65) Prior Publication Data

US 2021/0043170 A1 Feb. 11, 2021

(51) Int. Cl.
*G09G 5/38* (2006.01)

(52) U.S. Cl.
CPC .......... *G09G 5/38* (2013.01); *G09G 2354/00* (2013.01)

(58) Field of Classification Search
None
See application file for complete search history.

(56) References Cited

U.S. PATENT DOCUMENTS

| 9,202,443 B2 * | 12/2015 | Perez | G06Q 20/40145 |
| 9,239,460 B2 * | 1/2016 | Sylvan | G02B 27/0149 |
| 9,291,834 B2 * | 3/2016 | Silva | G02C 13/003 |
| 9,813,597 B2 * | 11/2017 | Kim | A61B 3/0025 |
| 10,401,625 B2 * | 9/2019 | Petrov | G06T 7/70 |
| 10,453,210 B2 * | 10/2019 | Hwang | A61B 3/111 |
| 10,506,219 B2 * | 12/2019 | Hwang | A61B 3/0025 |
| 10,674,141 B1 * | 6/2020 | Zhang | G02B 7/003 |
| 2006/0072206 A1 * | 4/2006 | Tsuyuki | H04N 13/344 359/631 |
| 2011/0310097 A1 * | 12/2011 | Ushio | H04N 13/261 345/419 |
| 2013/0050833 A1 * | 2/2013 | Lewis | A61B 3/111 359/630 |
| 2013/0083009 A1 * | 4/2013 | Geisner | A63F 13/816 345/419 |
| 2014/0036361 A1 | 5/2013 | Woodgate | |
| 2014/0152956 A1 * | 6/2014 | Silva | G02C 13/003 351/204 |
| 2014/0274391 A1 * | 9/2014 | Stafford | H04N 13/327 463/32 |

(Continued)

OTHER PUBLICATIONS

U.S. Appl. No. 16/532,288, filed Aug. 5, 2019, Titled, "Automatic Position Determination of Head Mounted Display Optics".

(Continued)

*Primary Examiner* — David D Davis
(74) *Attorney, Agent, or Firm* — Freestone Intellectual Property Law PLLC; Aaron J. Visbeek

(57) ABSTRACT

A method of automatic image alignment with head mounted display (HMD) optics includes generating a pixel pattern of display light on an electronic display of the HMD. A light sensor of the HMD then generates light measurements in response to the pixel pattern, where the light measurements are representative of a lateral position of an optical element of the HMD. The method also includes adjusting a rendering center of the electronic display for presentation of one or more images with respect to the optical element based on the light measurements.

20 Claims, 11 Drawing Sheets

(56) References Cited

U.S. PATENT DOCUMENTS

| | | | |
|---|---|---|---|
| 2016/0156896 A1* | 6/2016 | Heo | H04N 13/398 345/156 |
| 2016/0156902 A1* | 6/2016 | Lee | H04N 13/117 348/51 |
| 2016/0210782 A1 | 7/2016 | Thomas | |
| 2017/0111636 A1* | 4/2017 | Hasegawa | G06T 7/285 |
| 2017/0184847 A1* | 6/2017 | Petrov | H04N 5/2256 |
| 2018/0091805 A1* | 3/2018 | Liang | H04N 13/383 |
| 2018/0152698 A1* | 5/2018 | Hwang | G06K 9/0061 |
| 2019/0285880 A1* | 9/2019 | Tam | G02B 27/017 |

OTHER PUBLICATIONS

Non-Final Office Action, U.S. Appl. No. 16/532,288, dated Dec. 30, 2020, 21 pages.

* cited by examiner

AUTOMATIC IMAGE ALIGNMENT WITH HEAD MOUNTED DISPLAY OPTICS

CROSS-REFERENCE TO RELATED APPLICATION

This application is related to a U.S. non-provisional patent application entitled, "AUTOMATIC POSITION DETERMINATION OF HEAD MOUNTED DISPLAY OPTICS," U.S. application Ser. No. 16/532,288, filed Aug. 5, 2019.

FIELD OF DISCLOSURE

Aspects of the present disclosure relate generally to head mounted displays (HMDs), and in particular but not exclusively, relate to HMDs that include movable optics.

BACKGROUND

A head mounted display (HMD) is a display device, typically worn on the head of a user. HMDs may be used in a variety of applications, such as gaming, aviation, engineering, medicine, entertainment and so on to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. Some HMDs may be configured to allow binocular viewing by the user (e.g., allow viewing by both eyes).

Because the HMD may be used by different people, the distance between the left and right eye pieces may be made adjustable to account for variations in interpupillary distance (IPD). In some contexts, IPD refers to the distance between the centers of the pupils of a person's eyes. In the context of HMDs, the term "IPD" may be used to describe the distance between the exit pupils or optical axes of the optics of a binocular HMD. For some uses, incorrect adjustment of the IPD of the HMD may lead to an uncomfortable viewing experience and/or eye strain. In addition, adjustment of the IPD may change the position of the optics relative to an electronic display included in the HMD. However, changing the position of the optics relative to the electronic display may negatively affect the viewing of images rendered by the HMD, especially 3D or stereoscopic images. Thus, changes in the position of the optics may lead to a reduction in the immersion or presence experienced by the user.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to the automatic position determination of head mounted display (HMD) optics. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

As mentioned above, an HMD may include movable optics that allows users to adjust for various interpupillary distances (IPDs). However, changing the position of the optics may change their position relative to the electronic display of the HMD, which may degrade the user's viewing experience as some images, such as 3D images, may not appear as intended. Accordingly, aspects of the present disclosure provide for one or more mechanisms that provide for the automatic determination of the position of one or more optical elements (e.g., lenses) of an HMD. In some examples, the electronic display of the HMD is configured (or triggered) to generate a pixel pattern of display light. The position of the pixel pattern generated on the electronic display may be varied (e.g., swept across the electronic display). A light sensor included next to or near the optical element may generate light measurements as the pixel pattern is displayed. The light measurements may then be analyzed to determine a current position of the optical element based, in part, on a known and/or calibrated distance between the light sensor and the optical element, itself.

In addition, aspects of the present disclosure provide for the automatic alignment of images generated by the HMD with the optical elements. That is, once a current position of the optical element is determined, a rendering center of the electronic display may be adjusted to align subsequent images with the current position of the optical element. These and other features will be described in more detail below.

Figure 1:
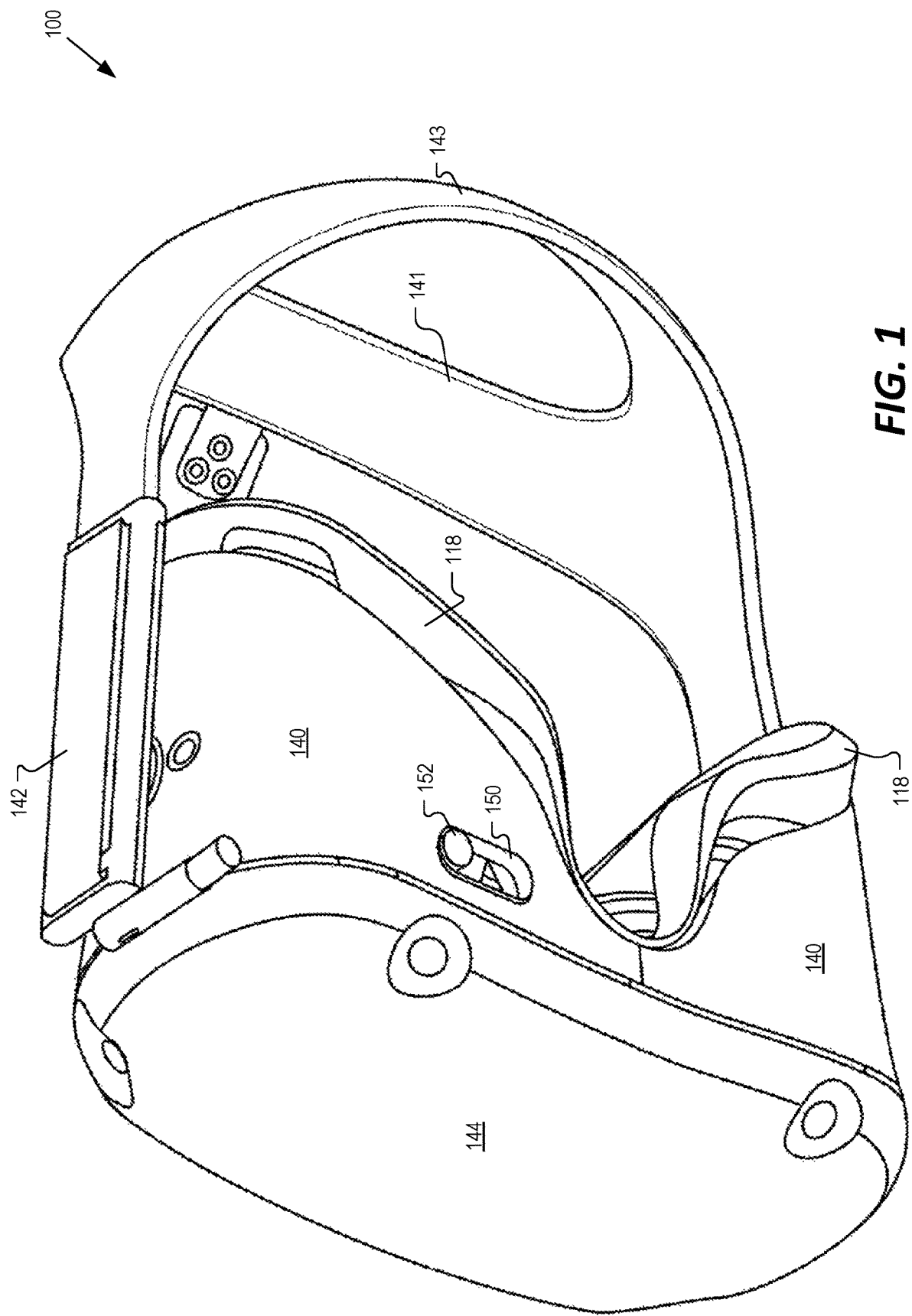
FIG. 1 illustrates an example head mounted display (HMD), in accordance with aspects of the present disclosure.

FIG. 1 illustrates an HMD 100, in accordance with aspects of the present disclosure. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces (not shown) for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

In some examples, an interpupillary distance (IPD) adjustment mechanism 150 may be included in the viewing structure 140 to allow for adjustments to the IPD of the HMD 100. As shown in FIG. 1, the IPD adjustment mechanism 150 may include a button 152 (or other mechanical feature) that is movable by the user of the HMD 100. Movement of the button 152 causes lateral movement of one or more adjustable eyecup housings included in the viewing structure 140. In some examples, the amount of adjustment to the IPD of the HMD 100 is determined by how much the user moves the button 152.

Figure 2:
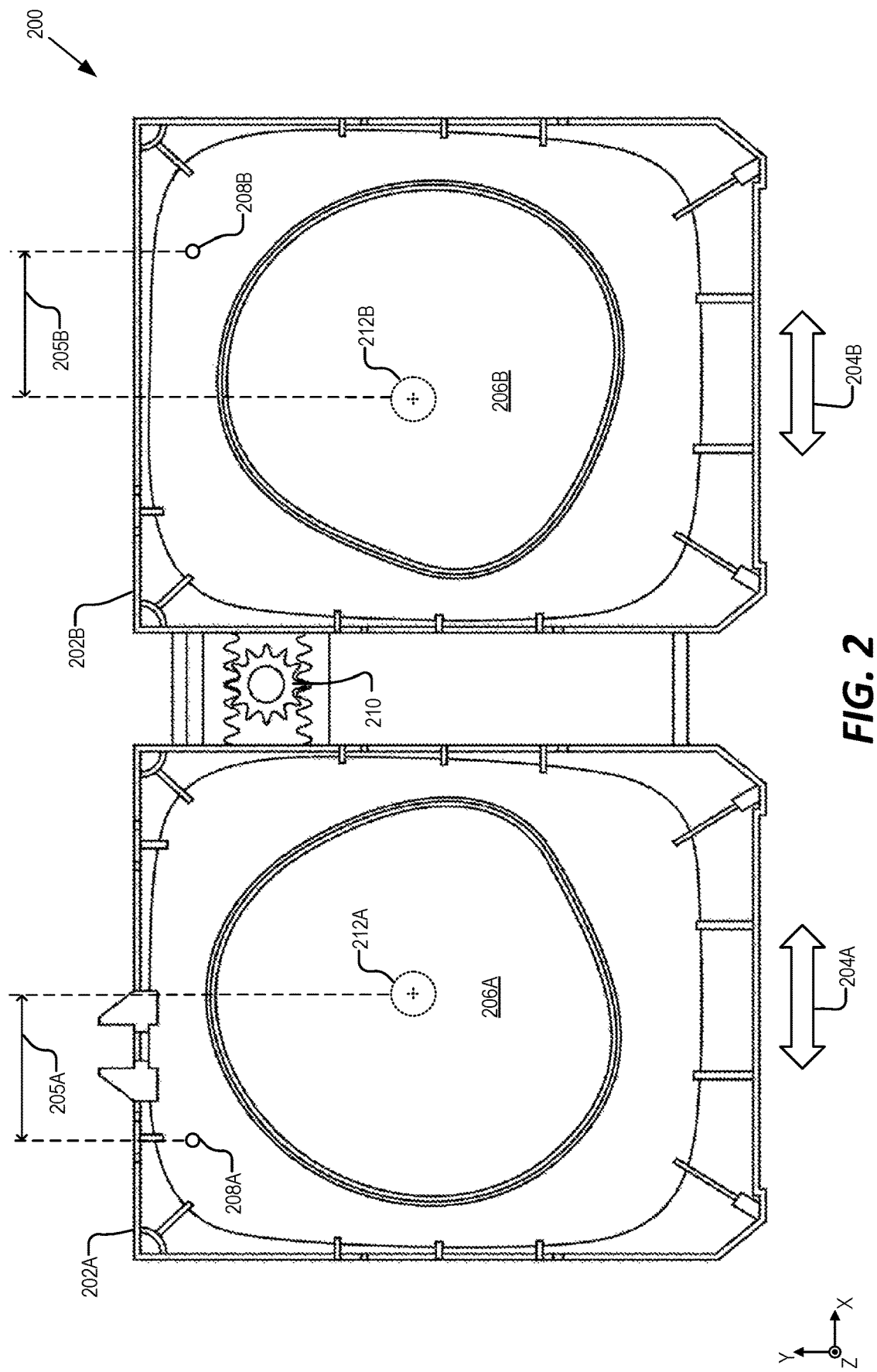
FIG. 2 illustrates an optical system of an HMD that includes adjustable eyecup housings, in accordance with aspects of the present disclosure.

By way of example, FIG. 2 illustrates a face of an optical system 200 (e.g., facing the electronic display) of an HMD that includes adjustable eyecup housings 202A and 202B. Optical system 200 is shown as including a first (e.g., right-eye) adjustable eyecup housing 202A, a second (e.g., left-eye) adjustable eyecup housing 202B, a first (e.g., right-eye) optical element 206A, a second (e.g., left-eye) optical element 206B, a first light sensor 208A, a second light sensor 208B, and a gear assembly 210. Also shown in FIG. 2 are an exit pupil 212A and an exit pupil 212B. Optical system 200 is one possible implementation of an optical system that may be incorporated into an HMD, such as HMD 100 of FIG. 1. For example, in one aspect, optical system 200 may be integrated into viewing structure 140 of HMD 100 for passing display light (e.g., light generated by an electronic display) to the eyes of a user.

As shown in FIG. 2, gear assembly 210 is coupled to the first and second adjustable eyecup housings 202A/202B. In one example, gear assembly 210 is mechanically coupled to button 152 of FIG. 1 to allow a user to adjust a lateral position of the optical elements 206A and 206B. That is, movement of the button 152 may cause lateral movement (e.g., lateral movements 204A and 204B along the x-axis) of the first and second adjustable eyecup housings 202A/202B via rotation of gear assembly 210. In some embodiments, the lateral movements 204A and 204B are symmetric, but in opposite directions. That is, gear assembly 210 may cause the simultaneous movement of both the adjustable eyecup housings towards one another (i.e., towards a nasal bridge or a center region of the HMD). In other example, gear assembly 210 may cause the simultaneous movement of both the adjustable eyecup housings away from one another (i.e., towards respective temple regions of the HMD). In some aspects, rotation of the gear assembly 210 causes lateral movement of one or more of the adjustable eyecup housings 202A/202B resulting in an adjustment of the IPD of the HMD.

The first adjustable eyecup housing 202A and the second adjustable eyecup housing 202B may include a respective optical element 206A/206B. The optical elements 206A and 206B may include one or more of a lens, a mirror, a diffuser, a filter, a polarizer, a prism, a window, a beam splitter, a diffractive element, or the like. The optical elements 206A and 206B are configured to receive display light generated by one or more electronic displays of the HMD and to direct/pass at least some of the display light to a user. In some examples, optical elements 206A and 206B are fixedly mounted to their respective adjustable eyecup housing, such that lateral movements of the adjustable eyecup housing results in the same lateral movement of the optical element. In one aspect, lateral movement 204A of the first optical element 206A relative to lateral movement 204B of the second optical element 206B changes a distance between their exit pupils 212A and 212B, and accordingly changes the IPD of the HMD. For example, a user may move the button 152 of FIG. 1 in one direction to increase the IPD of the HMD and may move the button 152 in the opposite direction to decrease the IPD.

In some aspects, the exit pupils 212A and 212B represent a center of their respective optical elements 206A/206B. Even still, in some examples, exit pupils 212A and 212B may be virtual apertures of their respective optical elements where only display light passing through this virtual aperture enters into the eye of the user. In some examples, the IPD of the HMD is the distance between exit pupil 212A and exit pupil 212B.

As further shown in FIG. 2, each adjustable eyecup housing may include a light sensor. For example, the first adjustable eyecup housing 202A is shown as including the first light sensor 208A and the second adjustable eyecup housing 202B is shown as including the second light sensor 208B. Light sensors 208A and 208B may include any active or passive sensor for measuring an aspect of the display light, such as its intensity. For example, light sensors 208A and 208B may include one or more of a photodiode, a phototransistor, or a photoresistor. In some aspects, the light sensors 208A and 208B are fixedly attached to their respective adjustable eyecup housings such that movement of the adjustable eyecup housings results in the same movement of the light sensor. In some examples, light sensors 208A/208B are disposed proximate to their respective optical elements facing the electronic display to generate light measurements in response to display light that is generated by the electronic display. In some embodiments, the light sensors 208A/208B are disposed a known or calibrated distance from the center of their respective optical element. For example, light sensor 208A is shown as disposed a calibrated distance 205A from the exit pupil 212A of optical element 206A. Similarly, light sensor 208B is disposed a calibrated distance 205B from the exit pupil 212B of the optical element 206B.

Figure 3:
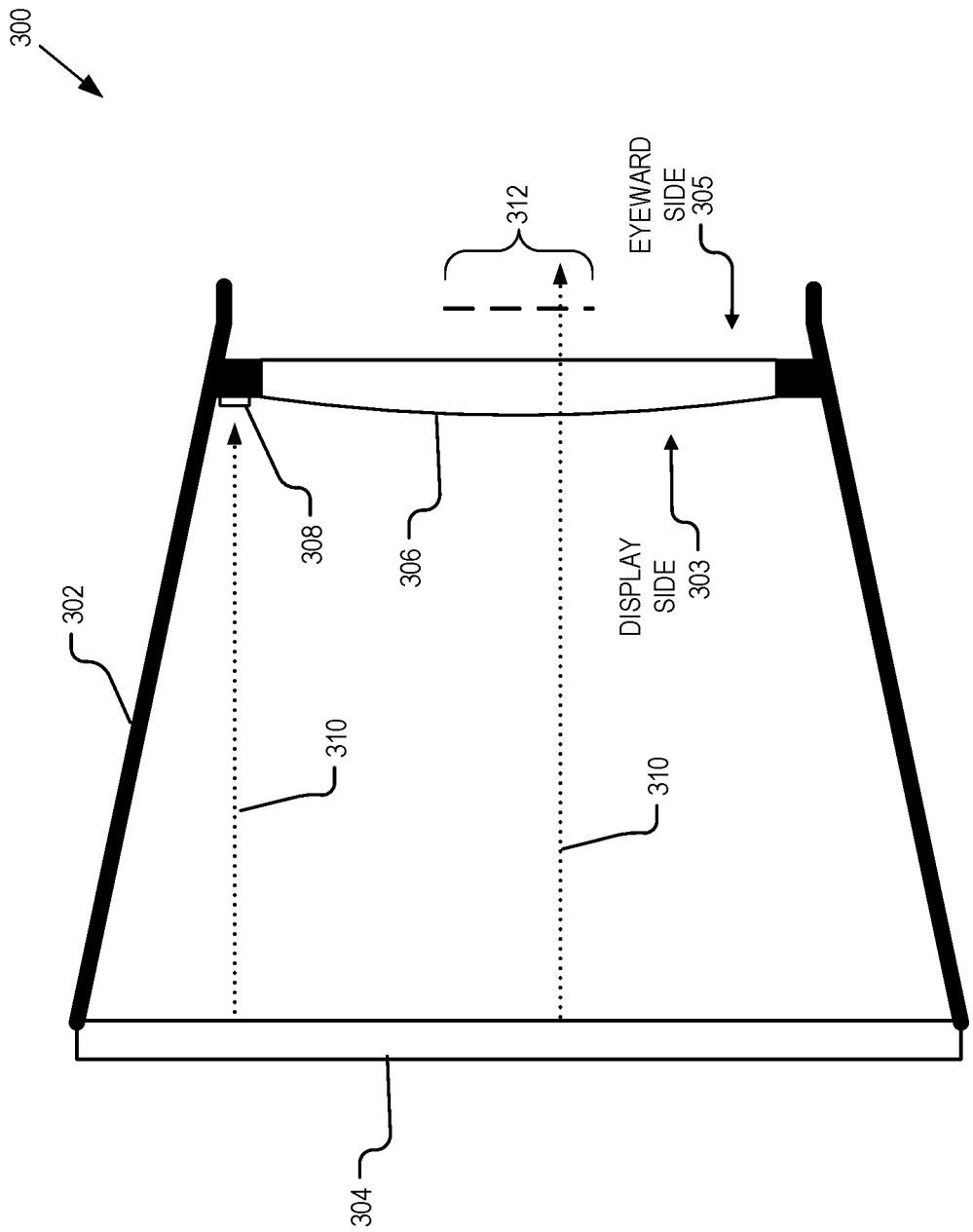
FIG. 3 illustrates a side view of an electronic display and an adjustable eyecup housing of an HMD, in accordance with aspects of the present disclosure.

In operation, the light sensors 208A and 208B are configured to generate light measurements (e.g., intensity values) of display light generated by the electronic display. For example, FIG. 3 illustrates a side view of an electronic display 304 and an adjustable eyecup housing 302 of an optical system 300, in accordance with aspects of the present disclosure. Optical system 300 is shown as including an electronic display 304 and an adjustable eyecup housing 302. Adjustable eyecup housing 302 is shown as including an optical element 306 and a light sensor 308. Optical system 300 is one possible example of optical system 200 of FIG. 2.

The electronic display 304 is configured to display or render images (e.g., 2D or 3D images) for presentation to the user. In various embodiments, the electronic display 304 comprises a single electronic display panel or multiple electronic display panels (e.g., a display for each eye of a user). Electronic display 304 may include a liquid crystal display (LCD), an organic light emitting diode (OLED) display, an inorganic light emitting diode (ILED) display, a micro light emitting diode (mLED), an active-matrix organic light-emitting diode (AMOLED) display, a transparent organic light emitting diode (TOLED) display, some other display, or any combination thereof. In some implementations, adjustable eyecup housing 302 is configured to allow movement of the optical element 306 that is independent of the electronic display 304. That is, changes in the lateral position of the adjustable eyecup housing 302 (and thus the optical element 306) may change the position of the optical element 306 with respect to the electronic display 304.

In operation, the electronic display 304 is configured to generate display light for presentation to the user. For example, as shown in FIG. 3, electronic display 304 generates display light 310, which is passed (e.g., focused) by the optical element 306 from the display side 303 to the eyeward side 305 and then to the exit pupil 312 to an eye of a user.

FIG. 3 also shows the light sensor 308 disposed on the display side 303 of the adjustable eyecup housing 302. The light sensor 308 is disposed proximate to the optical element 306 such that at least some of the display light 310 generated by the electronic display 304 is incident on the light sensor 308. As mentioned above, the light sensor 308 may be disposed a known or calibrated distance from the exit pupil 312. Although FIG. 3 illustrates light sensor 308 at a particular position on the display side 303 of the adjustable eyecup housing 302, light sensor 308 may be positioned at any location on the display side 303 provided that the distance between the light sensor 308 and the exit pupil 312 is known and/or calibrated. Thus, in some examples, the electronic display 304 may be configured to generate a pixel pattern of display light 310 in order to determine a lateral position of the optical element 306. For example, the location of the pixel pattern generated on the electronic display 304 may be varied (e.g., swept across the electronic display 304), where the light sensor 308 then generates a plurality of light measurements as the pixel pattern is displayed. The light measurements may then be analyzed to determine a current position of the optical element 306 based, in part, on the known or calibrated distance between the light sensor 308 and the exit pupil 312.

Figure 4:
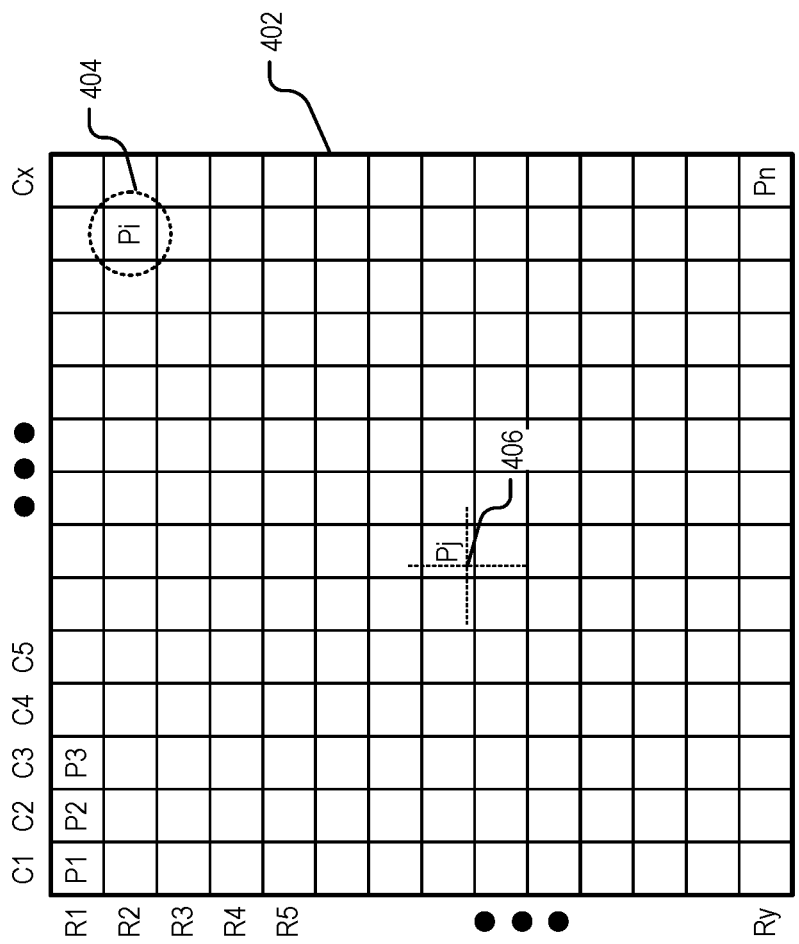
FIG. 4 illustrates a plan view of an electronic display and indications of the positions of a light sensor and a center of an optical element, in accordance with aspects of the present disclosure.

For example, FIG. 4 illustrates a plan view of an electronic display 402. Electronic display 402 is one possible implementation of any of the electronic displays discussed herein, including the electronic display included in the HMD 100 of FIG. 1 and/or the electronic display 304 of FIG. 3. The illustrated example of electronic display 402 is shown as a two-dimensional ("2D") array of pixels (e.g., pixels P1, P2 . . . , Pn). In one embodiment, each pixel is light emitting device, such as a light-emitting diode (LED). As illustrated, each pixel is arranged into a row (e.g., rows R1 to Ry) and a column (e.g., column C1 to Cx) to present an image of a person, place, or object to a user of the HMD.

In addition to rendering images for presentation to the user, the electronic display 402 may also be configured to generate one or more pixel patterns of display light for determining a lateral position of the optical element of the HMD. For example, FIG. 4 illustrates the current lateral position 404 of the light sensor with respect to the electronic display 402. While the pixel pattern of display light is generated by the electronic display 402, the light sensor may generate light measurements, such as intensity values. Based on the light measurements, the HMD may determine a first display coordinate of the electronic display 402 that is aligned with the light sensor. With reference to the example illustrated in FIG. 4, the HMD may analyze the light measurements to determine that the display coordinate aligned with the light sensor is the column associated with pixel Pi.

FIG. 4 also illustrates the current lateral position 406 of the optical element of the HMD. In some examples, the lateral position 406 of the optical element represents the center or exit pupil of the optical element. Once the current lateral position 404 of the light sensor is determined, the HMD may then determine the display coordinate that is aligned with the current lateral position 406 of the optical element. In some examples, the display coordinate of the optical element is determined based on a known or calibrated distance between the light sensor and the center of the optical element. In the illustrated example of FIG. 4, the display coordinate aligned with the center of the optical element is the column associated with pixel Pj. Thus, in some aspects, the current lateral position 406 of the optical element is a position of the exit pupil of the optical element with respect to at least one pixel (e.g., pixel Pj) of the electronic display 402.

Figure 5:
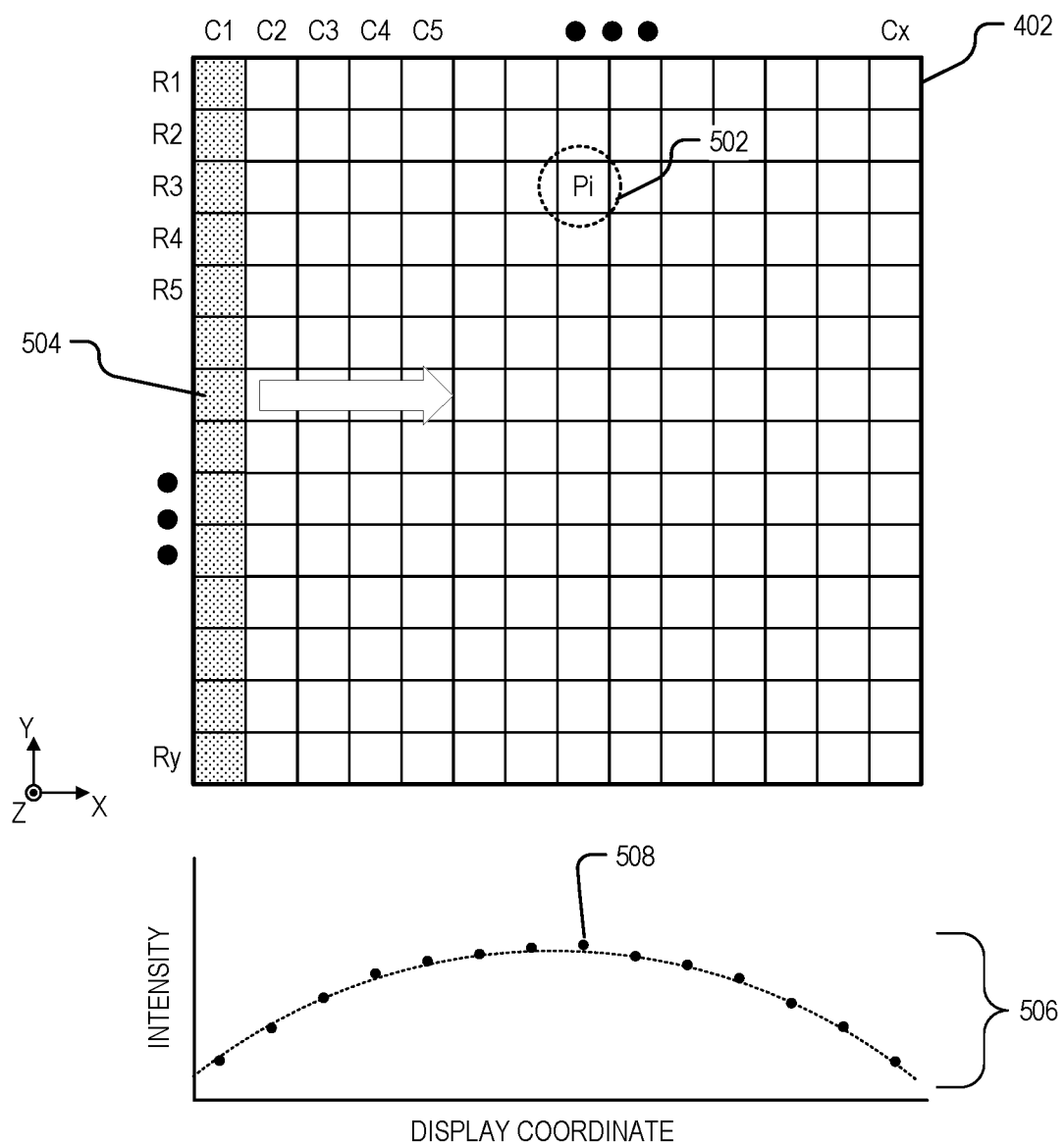
FIG. 5 illustrates pixel pattern of display light generated by an electronic display and corresponding light measurements of a light sensor, in accordance with aspects of the present disclosure.

As mentioned above, the light sensor may be configured to generate light measurements based on a pixel pattern of display light that is generated by the electronic display 402. In some examples, a location of the pixel pattern on the electronic display is varied, where the light sensor generates a light measurement corresponding to each location of the pixel pattern that is displayed. The electronic display 402 may be configured to render a variety of pixel patterns and to vary the location of the pixel pattern in a variety of ways. For example, FIG. 5 illustrates a pixel pattern 504 that includes a single column of pixels. FIG. 5 also illustrates a current lateral position 502 of the light sensor. Thus, in some embodiments, the light sensor is configured to generate a light measurement (e.g., intensity value) for each of a plurality of locations that the pixel pattern 504 is rendered on the electronic display 402. For example, the light sensor may generate a first light measurement when the pixel pattern 504 is illuminated at column C1, a second light measurement when the pixel pattern 504 is illuminated at column C2, and so on. In some examples, the pixel pattern is sequentially swept across the electronic display 402 (e.g., column C1, then column C2, then column C3, etc.). In other examples, the location of the pixel pattern displayed may be non-sequential (e.g., column C4, then column C1, then column Cx, etc.).

FIG. 5 also illustrates a plurality of light measurements 506 that are generated by the light sensor as the location of the pixel pattern 504 is varied on the electronic display 402. As shown in FIG. 5, the light measurements 506 may include intensity values of the display light measured by the light sensor. The light measurements 506 may then be analyzed to determine a current position of the light sensor.

In some embodiments, analyzing the light measurements 506 includes determining a peak intensity value 508. In the example of FIG. 5, the peak intensity value 508 corresponds to a location coordinate associated with the column of pixel Pi. Thus, the HMD may determine that the current lateral position 502 of the light sensor is aligned with the column associated with pixel Pi.

Figure 6A:
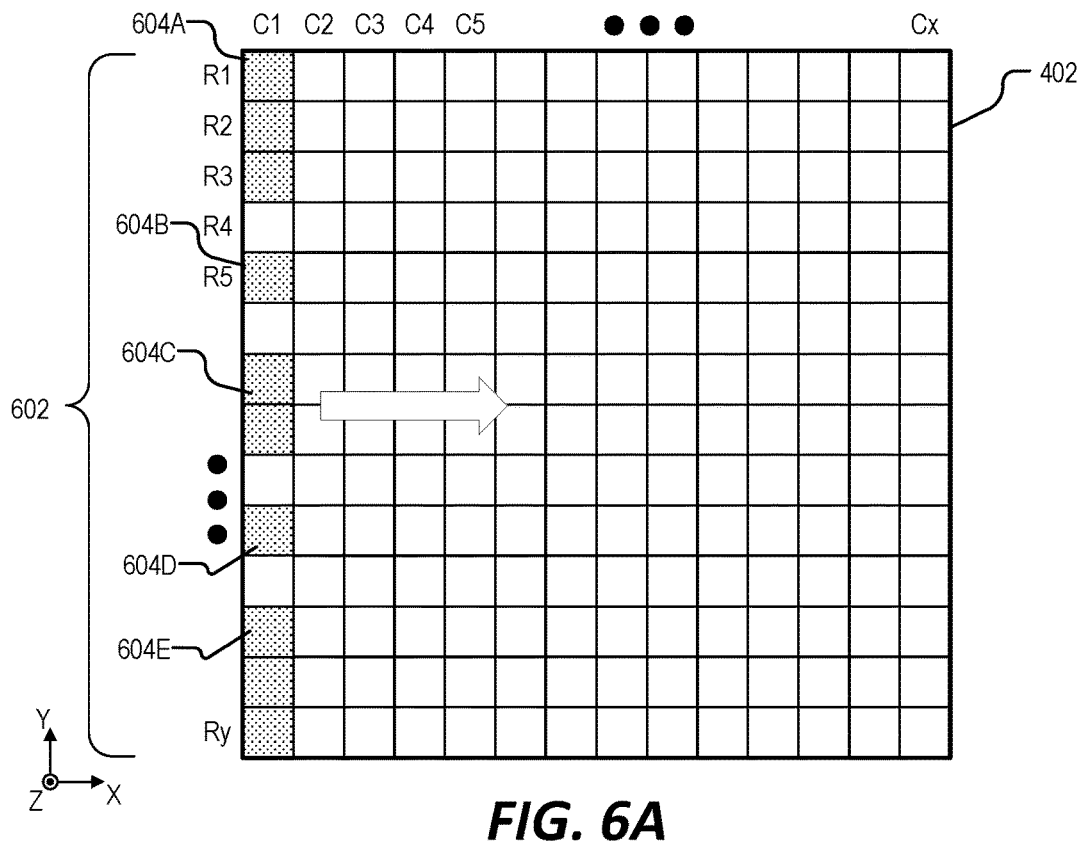
FIGS. 6A-6D illustrate various pixel patterns of display light generated by an electronic display, in accordance with aspects of the present disclosure.

FIGS. 6A-6D illustrate various alternative pixel patterns of display light generated by electronic display 402, in accordance with aspects of the present disclosure. For example, FIG. 6A illustrates a pixel pattern 602 that includes a single column of pixels segmented into several groups 604A-604E of pixels. As with the single column pixel pattern 504 of FIG. 5, the location of pixel pattern 602 may be varied on electronic display 402 to generate a plurality of light measurements. Thus, in some embodiments, each light measurement generated by the light sensor may include an intensity value measured while a single column of segmented pixels is illuminated by the electronic display 402.

Figure 6B:
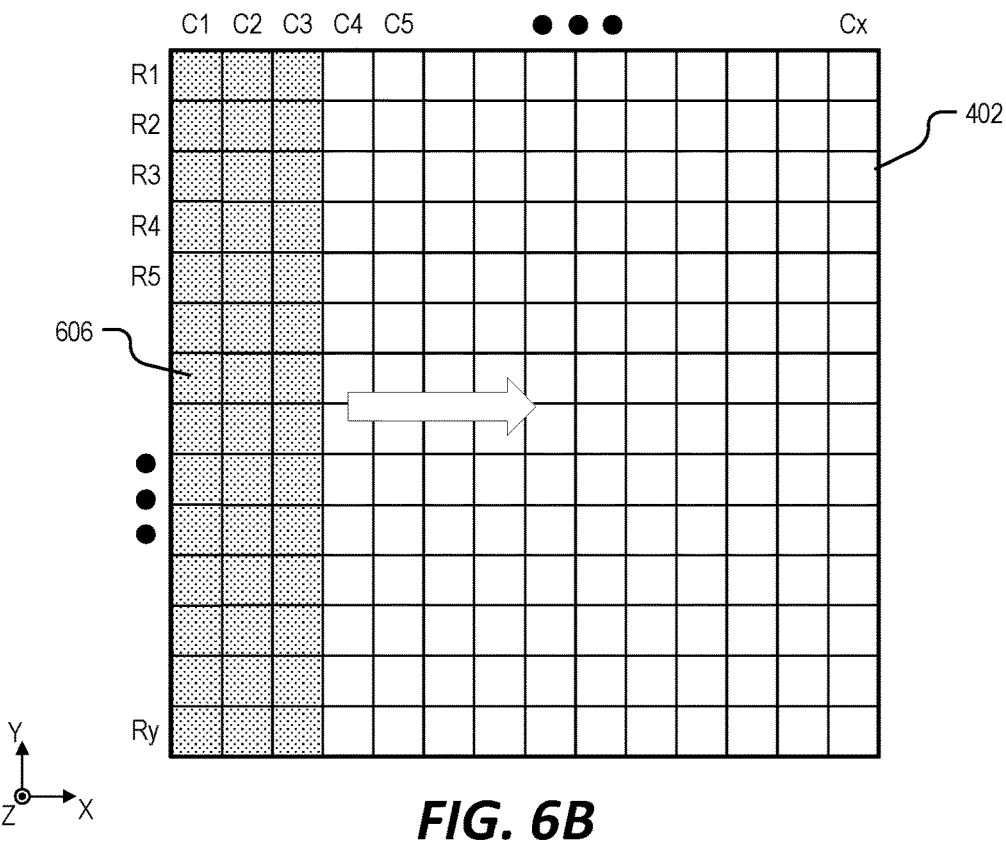

FIG. 6B illustrates another example pixel pattern 606 that includes multiple columns of pixels. As with the single column pixel pattern 504 of FIG. 5, the location of pixel pattern 606 may be varied on electronic display 402 to generate a plurality of light measurements. Thus, in some embodiments, each light measurement generated by the light sensor may include an intensity value measured while multiple columns of pixels are simultaneously illuminated by the electronic display 402. Although FIG. 6B illustrates the pixel pattern 606 as including three columns of pixels, pixel pattern 606 may include any number of simultaneously illuminated columns including two or more.

Figure 6C:
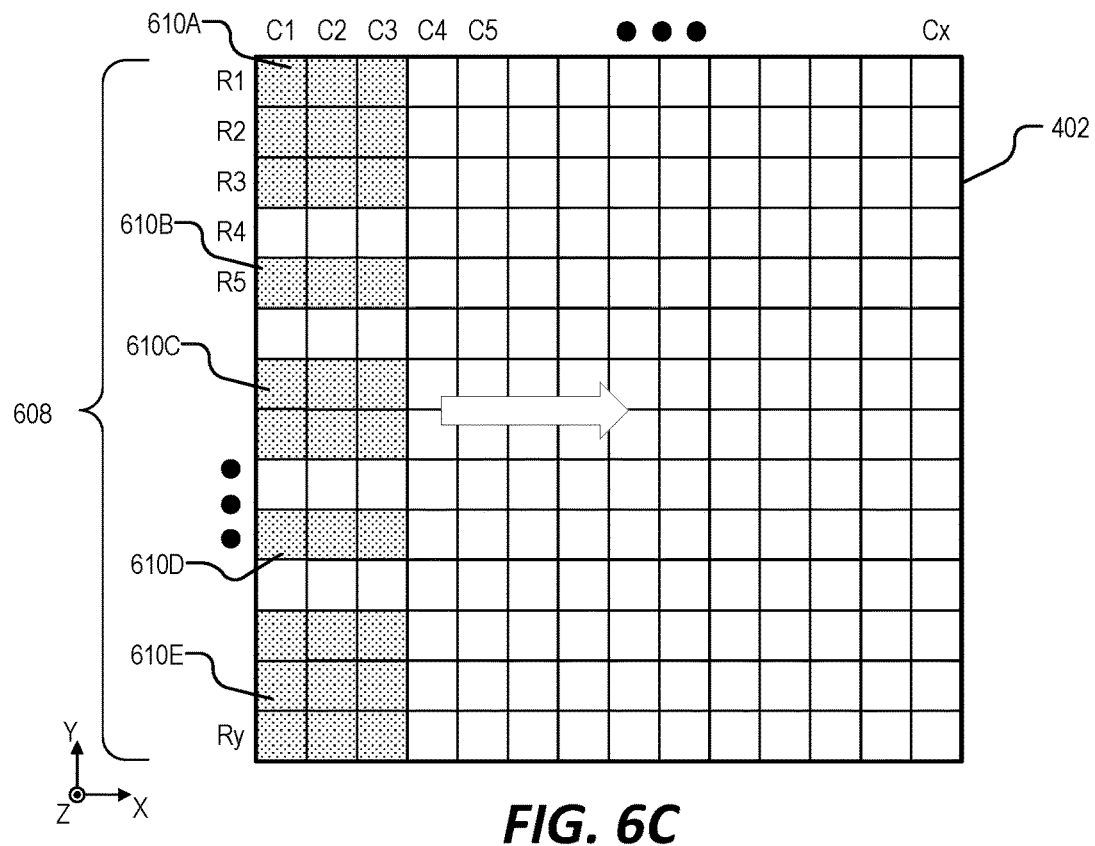

FIG. 6C illustrates yet another example pixel pattern 608 that includes multiple columns segmented into several groups of pixels 610A-610E. As with the single column pixel pattern 504 of FIG. 5, the location of pixel pattern 608 may be varied on electronic display 402 to generate a plurality of light measurements. Thus, in some embodiments, each light measurement generated by the light sensor may include an intensity value measured while multiple columns of segmented pixels are simultaneously illuminated by the electronic display 402. Although FIG. 6C illustrates the pixel pattern 608 as including three columns of segmented pixels, pixel pattern 608 may include any number of simultaneously illuminated columns including two or more.

Figure 6D:
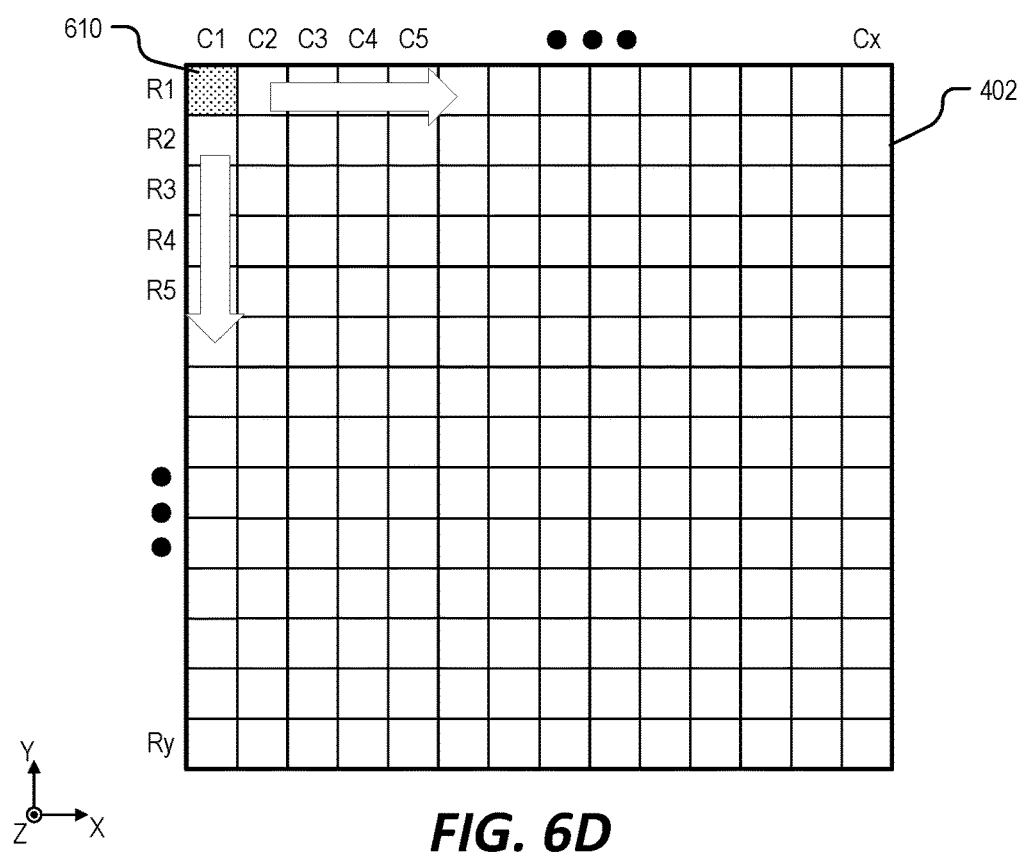

FIG. 6D illustrates an example pixel pattern 610 that includes a single pixel. As with the single column pixel pattern 504 of FIG. 5, the location of pixel pattern 610 may be varied on electronic display 402 to generate a plurality of light measurements. Thus, in some embodiments, each light measurement generated by the light sensor may include an intensity value measured while a single pixel is illuminated by the electronic display 402. In some aspects, the example pixel patterns 504, 602, 606, and 608 of FIGS. 5-6C may result in light measurements having a higher dynamic range as compared to the single pixel pattern 610 of FIG. 6D. Having a higher dynamic range may increase the accuracy when analyzing the light measurements, such as when determining a peak intensity value. However, in some examples, varying the location of the single pixel pattern 610 may include varying both the column and row of the single pixel that is illuminated. Thus, using a single pixel, such as the pixel pattern 610 of FIG. 6D may allow for the determination of not only the lateral position of the light sensor along the x-axis but also for determining the vertical position of the light sensor along the y-axis.

Figure 7:
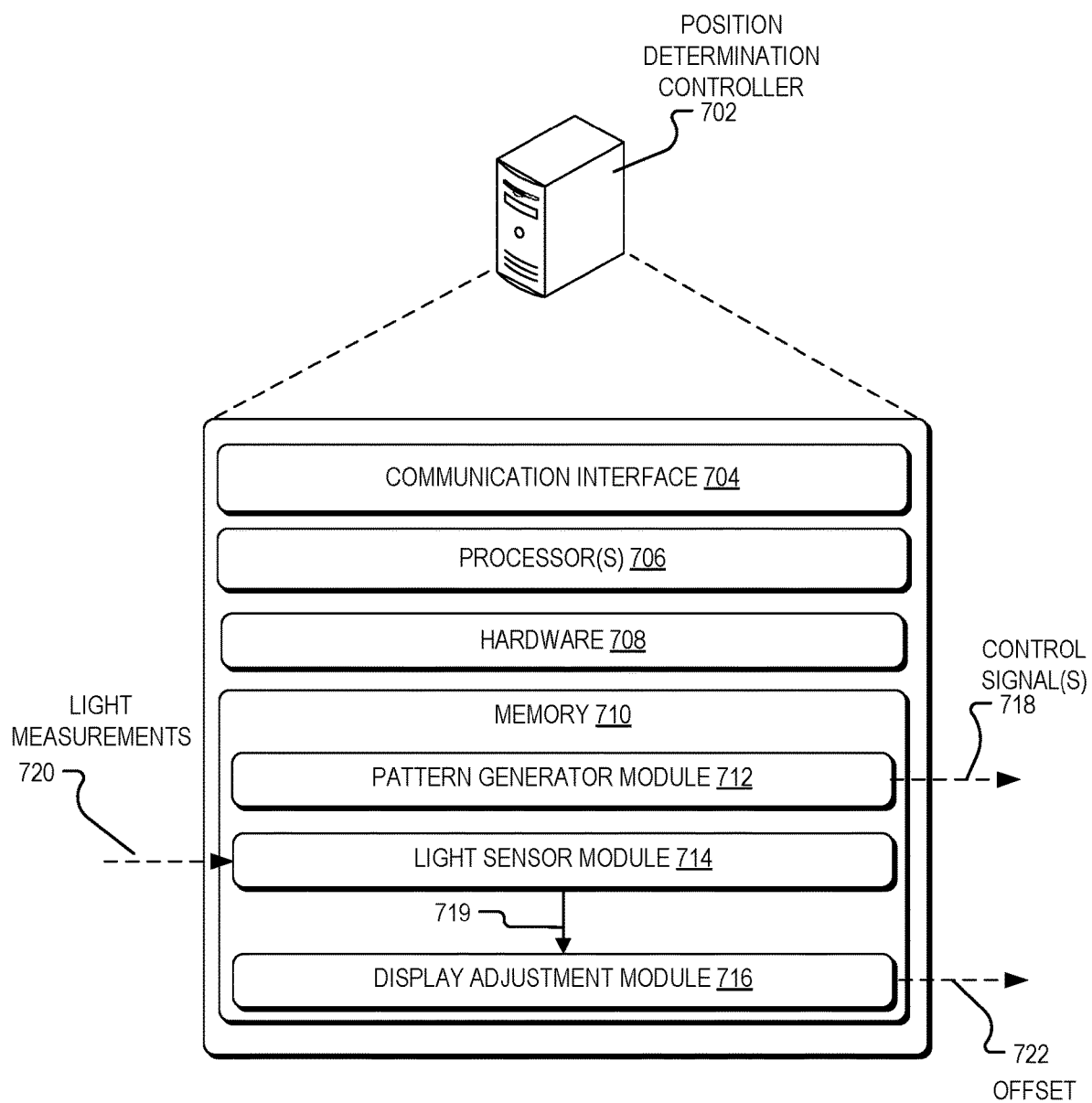
FIG. 7 illustrates an example position determination controller, in accordance with aspects of the present disclosure.

FIG. 7 illustrates an example position determination controller 702, in accordance with aspects of the present disclosure. The illustrated example of position determination controller 702 is shown as including a communication interface 704, one or more processors 706, hardware 708, and a memory 710. The position determination controller 702 is one possible implementation of a computing device that may be incorporated into, or communicatively coupled to, the HMD 100 of FIG. 1.

The communication interface 704 may include wireless and/or wired communication components that enable the position determination controller 702 to transmit data to and receive data from other devices. The hardware 708 may include additional hardware interface, data communication, or data storage hardware. For example, the hardware interfaces may include a data output device (e.g., electronic display, audio speakers), and one or more data input devices.

The memory 710 may be implemented using non-transitory computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 706 and the memory 710 of the position determination controller 702 may implement a pattern generator module 712, a light sensor module 714, and a display adjustment module 716. The pattern generator module 712, light sensor module 714, and display adjustment module 716 may include routines, program instructions, objects, and/or data structures that perform particular tasks or implement particular abstract data types. The memory 710 may also include a data store (not shown) that is used by the pattern generator module 712, light sensor module 714, and display adjustment module 716.

The pattern generator module 712 may be configured to generate one or more control signals 718 to trigger or direct the electronic display (e.g., electronic display 304 of FIG. 3) to generate a pixel pattern of display light. In some examples, the pattern generator module 712 generates the control signals 718 as part of a startup procedure (e.g., upon powering on) of the HMD. In other examples, the pattern generator module 712 may generate the control signals 718 in response to input received from the user, either by way of a software calibration feature and/or in response to detecting that the user has adjusted the IPD (e.g., by detecting movements of the button 152 of FIG. 1). In some examples, the pattern generator module 712 may generate the control signals 718 to direct the electronic display to present any of the pixel patterns discussed herein, such as pixel pattern 504 of FIG. 5, pixel pattern 602 of FIG. 6A, pixel pattern 606 of FIG. 6B, pixel pattern 608 of FIG. 6C, and/or pixel pattern 610 of FIG. 6D. In addition, the pattern generator module 712 may generate the control signals 718 to vary the location of the pixel pattern that is presented on the electronic display.

The light sensor module 714 may be configured to receive/obtain a plurality of light measurements 720 generated by the light sensor in response to the illumination of the pixel pattern on the electronic display. In some examples, the light sensor module 714 is configured to associate each of the received light measurements with a corresponding display coordinate. That is, a first light measurement may be associated with a first column of the electronic display when the pixel pattern is illuminated at or about the first column. Similarly, a second light measurement may be associated with a second column of the electronic display when the pixel pattern is illuminated at or about the second column.

In some aspects, the light sensor module 714 may be configured to analyze the light measurements 720 to determine the lateral position of the light sensor and/or the lateral position of the optical element. As discussed above, in one example, analyzing the light measurements 720 may include determining a peak intensity value of the light measurements 720 (e.g., peak intensity value 508 of FIG. 5). As shown in FIG. 7, the light sensor module 714 may be configured to generate an output 719. In some examples, output 719 is representative of the current lateral position of the light sensor and/or optical element. In some examples, the output 719 may also be representative of a current IPD of the HMD. That is, in some examples, the light sensor module 714 may determine a lateral position of a first optical element (e.g., left-eye optical element) and a lateral position of a second optical element (e.g., right-eye optical element). The light sensor module 714 may then determine the IPD based on a distance between the determined lateral positions of the two optical elements.

As shown in FIG. 7, the memory 710 may also include a display adjustment module 716. As will be described in more detail below with reference to FIGS. 9, 10A and 10B, the display adjustment module 716 may be configured to adjust a rendering center of the electronic display. That is, the display adjustment module 716 may be configured to generate an offset 722 to move/adjust the rendering center of the electronic display based on the output 719 (e.g., lateral positions, IPD, etc.) generated by the light sensor module 714. In some examples, adjusting the rendering center of the electronic display may adjust where images are presented on the electronic display with respect to the optical elements of the HMD. Even still, adjusting the rendering center of the electronic display may include aligning the rendering center of the electronic display with the center of the optical element.

Figure 8A:
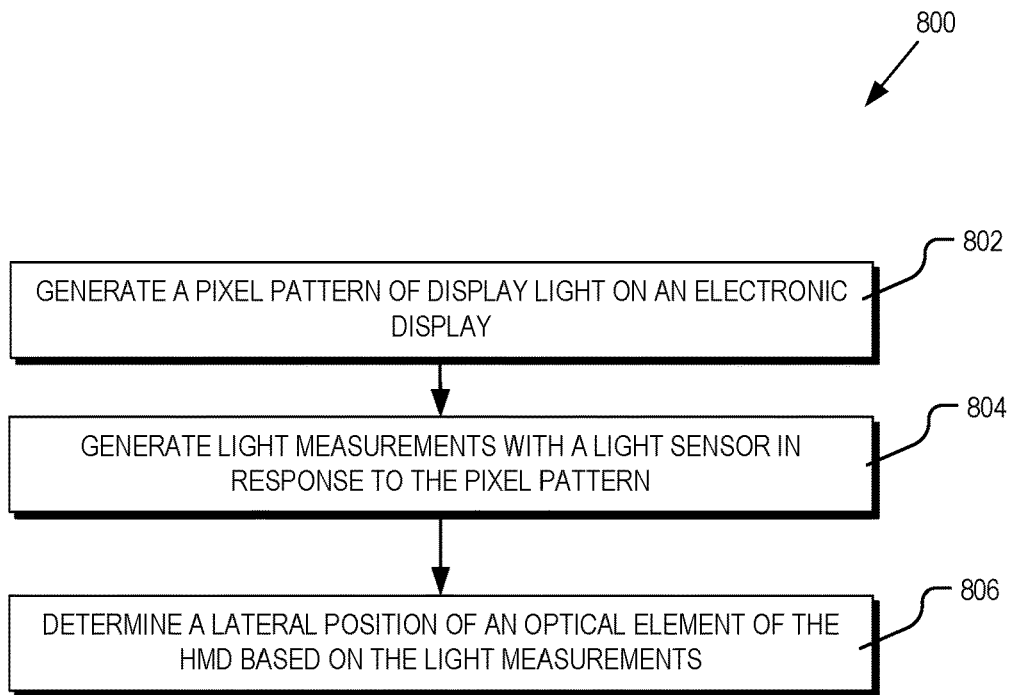
FIG. 8A is a flow chart illustrating an example process of automatic position determination of HMD optics, in accordance with aspects of the present disclosure.

FIG. 8A is a flow chart illustrating an example process 800 of automatic position determination of HMD optics, in accordance with aspects of the present disclosure. Process 800 is one possible process performed by the position determination controller 702 of FIG. 7.

In a process block 802, the electronic display (e.g., electronic display 304 of FIG. 3) generates a pixel pattern of display light. As discussed above, in some examples, the electronic display may generate the pixel pattern in response to one or more control signals 718 generated by the pattern generator module 712 of FIG. 7. While the pixel pattern is rendered on the electronic display, process block 804 includes the light sensor (e.g., light sensor 308 of FIG. 3) generating light measurements in response to the pixel pattern. In some examples, the light measurements include intensity values such as those shown in FIG. 5. Next, in a process block 806, the light sensor module 714 determines a lateral position of one or both optical elements of the HMD. The light sensor module 714 may determine the lateral position based on the light measurements obtained by the light sensor. In some examples, process block 806 also includes the light sensor module 714 determining an IPD of the HMD based on light measurements received from a light sensor of a first adjustable eyecup housing (e.g., light sensor 208A of adjustable eyecup housing 202A of FIG. 2) and based on light measurements received from a light sensor of a second adjustable eyecup housing (e.g., light sensor 208B of adjustable eyecup housing 202B of FIG. 2).

Figure 8B:
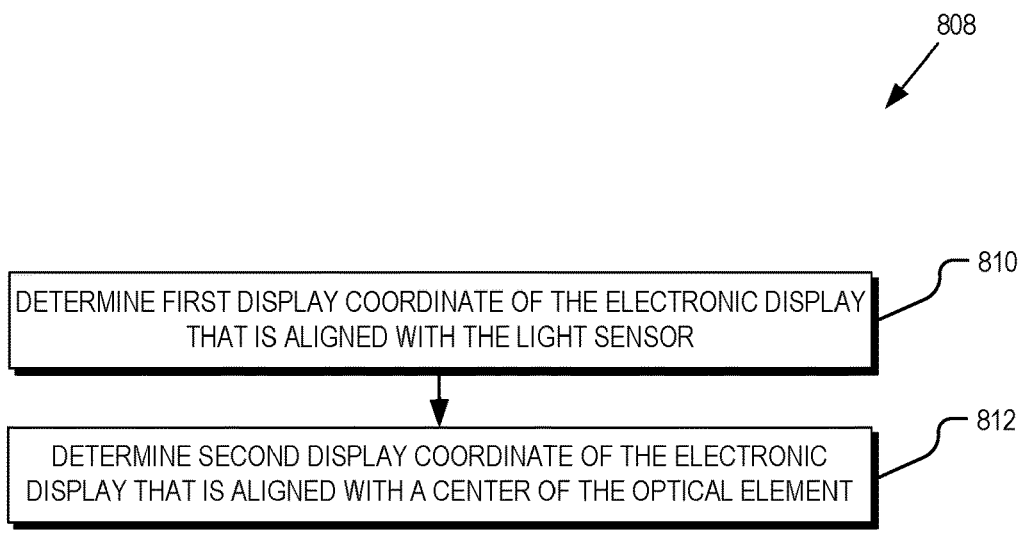
FIG. 8B is a flow chart illustrating an example process of determining a lateral position of an optical element, in accordance with aspects of the present disclosure.

FIG. 8B is a flow chart illustrating an example process 808 of determining a lateral position of an optical element, in accordance with aspects of the present disclosure. Process 808 is one possible implementation of process block 806 of FIG. 8A.

In a process block 810, the light sensor module 714 may determine a first display coordinate of the electronic display that is aligned with the light sensor. For example, referring back to FIG. 4, the light sensor module 714 may determine that the first display coordinate associated with the column of pixel Pi is aligned with the current lateral position 404 of the light sensor.

Next, in process block 812, the light sensor module 714 may determine a second display coordinate of the electronic display that is aligned with the center of the optical element. As discussed above, with reference to FIG. 4, the determination of the second display coordinate may be based on the determined current lateral position 404 of the light sensor and on a known or calibrated distance between the light sensor and the center of the optical element. In the example of FIG. 4, the current lateral position 406 of the center of the optical element is determined to be aligned with the column associated with pixel Pj.

Figure 9:
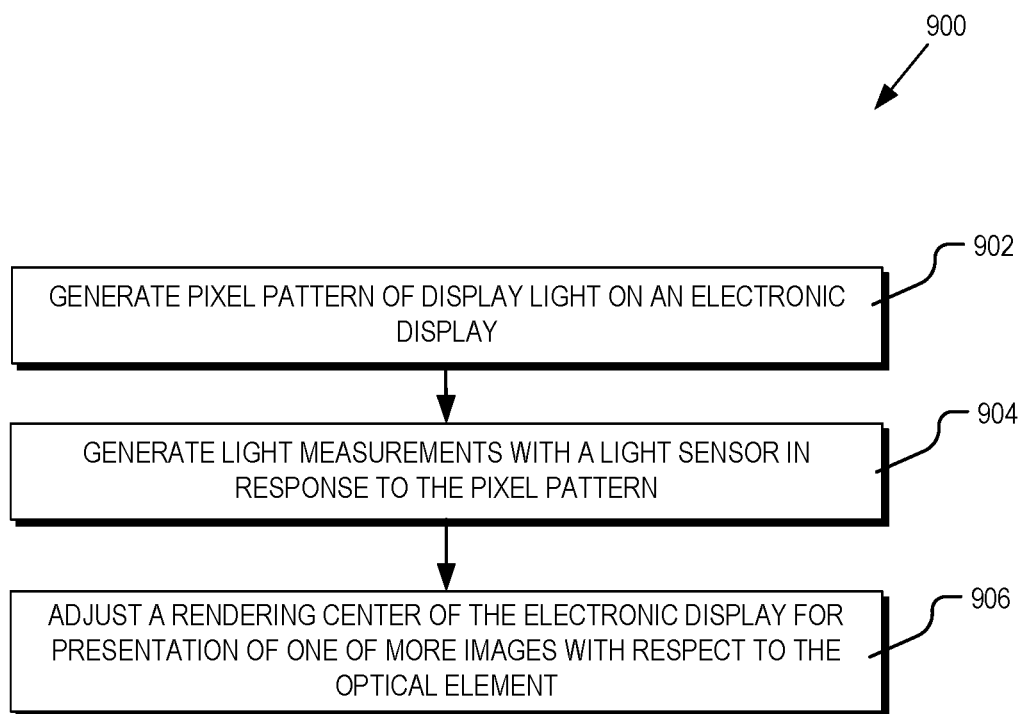
FIG. 9 is a flow chart illustrating an example process of automatic image alignment with HMD optics, in accordance with aspects of the present disclosure.

FIG. 9 is a flow chart illustrating an example process 900 of automatic image alignment with HMD optics, in accordance with aspects of the present disclosure. Process 900 is one possible process performed by the position determination controller 702 of FIG. 7.

In a process block 902, the electronic display (e.g., electronic display 304 of FIG. 3) generates a pixel pattern of display light. As discussed above, in some examples, the electronic display may generate the pixel pattern in response to one or more control signals 718 generated by the pattern generator module 712 of FIG. 7. While the pixel pattern is rendered on the electronic display, process block 904 includes the light sensor (e.g., light sensor 308 of FIG. 3) generating light measurements in response to the pixel pattern. In some examples, the light measurements include intensity values such as those shown in FIG. 5. Process block 904 may also include the light sensor module 714 determining the lateral position of one or both optical elements of the HMD and/or determining the IPD of the HMD based on the light measurements.

Next, in process block 906, the display adjustment module 716 generates an offset 722 to adjust a rendering center of the electronic display. In some examples, adjusting the rendering center of the electronic display includes adjusting the location of where images are presented on the electronic display with respect to the one or more optical elements. Even still, adjusting the rendering center of the electronic display may include aligning the rendering center with the lateral position of the center of the optical element.

Figure 10A:
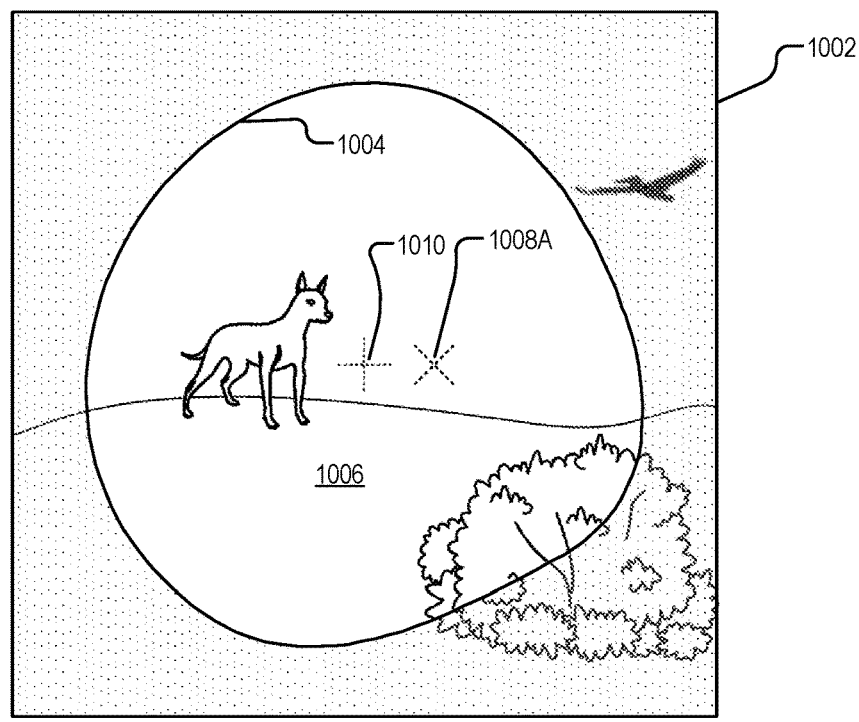
FIGS. 10A and 10B illustrate the rendering of an example image by an electronic display of an HMD that includes the adjustment of a rendering center of the electronic display, in accordance with aspects of the present disclosure.
Figure 10B:
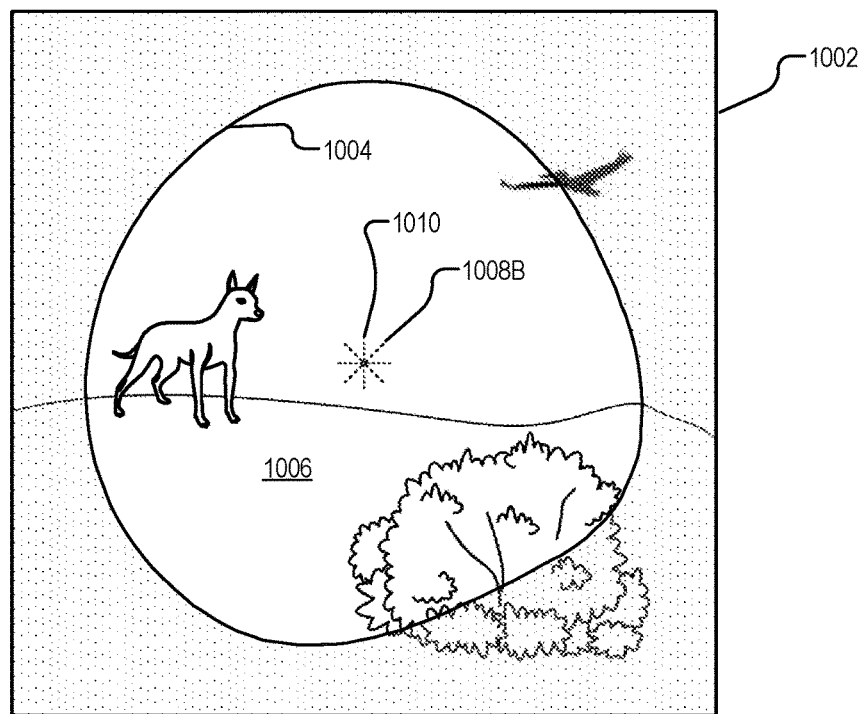

By way of example, FIGS. 10A and 10B illustrate the rendering of example images 1006 by an electronic display 1002 of an HMD that includes the adjustment of a rendering center, in accordance with aspects of the present disclosure. In some implementations, the electronic display of an HMD may include a rendering center. The rendering center may be a display coordinate which serves as a reference for displaying images on the electronic display. In one aspect, the HMD is configured to center the images about the rendering center for presentation to the user. However, as mentioned above, the HMD may include movable optics which allow users to adjust for various interpupillary distances (IPDs).

Changing the position of the optics may change their position relative to the rendering center of the electronic display of the HMD, which may degrade the user's viewing experience as some images, such as 3D images, may not appear as intended. By way of example, FIG. 10A illustrates an image 1006 rendered on an electronic display 1002. FIG. 10A also shows a rendering center 1008A of the electronic display 1002 as well as a center (e.g., exit pupil) 1010 of the optical element 1004. As shown in FIG. 10A, the center 1010 of the optical element 1004 is not aligned with the rendering center 1008A of the electronic display 1002. This misalignment between the center 1010 and the rendering center 1008A could be due to the user adjusting the IPD and/or could be due to the HMD becoming out of calibration. Thus, the image 1006 may not be viewed correctly by the user. That is, one or more of the objects included in the image 1006 may appear distorted, skewed, and/or positioned incorrectly in virtual space.

Accordingly, the automatic image alignment process 900 of FIG. 9 may be performed to determine a current position of the optics included in the HMD and to adjust the rendering center of the electronic display 1002. For example, FIG. 10B illustrates image 1006 rendered on electronic display 1002 with an adjusted rendering center 1008B. As shown in FIG. 10B, the adjusted rendering center 1008B has moved to the left (relative to rendering center 1008A of FIG. 10A) to align the adjusted rendering center 1008B with the center 1010 of the optical element 1004. As further shown in FIG. 10B, adjusting the rendering center may result in a shift of the entire image 1006.

The functionality of one or more components described above with reference to FIGS. 1-10A may be implemented in various ways consistent with the teachings herein. In some designs, the functionality of these components may be implemented as one or more discrete components. In addition, the components and functions represented by FIGS. 1-10A, as well as other components and functions described herein, may be implemented using any suitable means. Such means also may be implemented, at least in part, using corresponding structure as taught herein. For example, a means for generating a pixel pattern of display light on an electronic display may correspond at least in some aspects to, for example, the electronic display 304 of FIG. 3, the electronic display 402 of FIG. 4, the one or more processors 706 of FIG. 7, and/or the pattern generator module 712 of FIG. 7. In addition, a means for generating light measurements in response to the pixel pattern may correspond at least in some aspects to, for example, the light sensors 208A and 208B of FIG. 1, and/or the light sensor 308 of FIG. 3. Even still, a means for determining an IPD of the HMD based on one or more intensity values of the light measurements may correspond at least in some aspect to, for example, the one or more processors 706 of FIG. 7, and/or the light sensor module 714 of FIG. 7. Thus, in some aspects one or more of such means may be implemented using one or more components, mediums, or other suitable structure as taught herein.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for use with a head mounted display (HMD), the method comprising:
    generating a pixel pattern of display light on an electronic display of the HMD;
    varying a location of the pixel pattern on the electronic display;
    generating light measurements of the display light with a light sensor of the HMD while the location of the pixel pattern is varied, wherein the light measurements are representative of a lateral position of an optical element of the HMD; and
    adjusting a rendering center of the electronic display for presentation of one or more images with respect to the optical element based on the light measurements wherein adjusting the rendering center of the electronic display includes adjusting a location of where the one or more images are to be presented on the electronic display.

2. The computer-implemented method of claim 1, wherein adjusting the rendering center of the electronic display comprises:
    determining a position of a center of the optical element based on the light measurements; and
    aligning the rendering center of the electronic display with the center of the optical element.

3. The computer-implemented method of claim 2, wherein determining the position of the center of the optical element comprises:
    determining a first display coordinate of the electronic display that is aligned with the light sensor based on corresponding intensity values of the light measurements; and
    determining a second display coordinate of the electronic display that is aligned with the center of the optical element based on the first display coordinate and a calibrated distance between the light sensor and the center of the optical element.

4. The computer-implemented method of claim 1, wherein the pixel pattern comprises a single column of pixels, wherein each of the light measurements includes an intensity value measured by the light sensor while the single column of pixels is illuminated at a respective display coordinate of the electronic display.

5. The computer-implemented method of claim 1, wherein the pixel pattern comprises multiple columns of pixels, wherein each of the light measurements includes an intensity value measured by the light sensor while the multiple columns of pixels are simultaneously illuminated at a respective display coordinate of the electronic display.

6. The computer-implemented method of claim 1, wherein the pixel pattern comprises at least one column of pixels segmented into several groups of pixels, wherein each of the light measurements includes an intensity value measured by the light sensor while the at least one column of pixels is illuminated at a respective display coordinate of the electronic display.

7. The computer-implemented method of claim 1, wherein the pixel pattern comprises a single pixel, wherein each of the light measurements includes an intensity value measured by the light sensor while the single pixel is illuminated at a respective display coordinate of the electronic display.

8. A head mounted display (HMD), comprising:
an electronic display configured to generate display light;
an optical element configured to pass the display light to a user of the HMD;
a light sensor coupled to the optical element;
at least one processor; and
at least one memory coupled to the at least one processor, the at least one memory having instructions stored therein, which when executed by the at least one processor, direct the HMD to:
generate a pixel pattern of the display light on the electronic display;
vary a location of the pixel pattern on the electronic display;
generate light measurements with the light sensor while the location of the pixel pattern is varied, wherein the light measurements are representative of a lateral position of the optical element; and
adjust a rendering center of the electronic display for presentation of one or more images with respect to the optical element based on the light measurements wherein the instructions to adjust the rendering center of the electronic display includes instructions to adjust a location of where the one or more images are to be presented on the electronic display.

9. The HMD of claim 8, wherein the instructions to adjust the rendering center of the electronic display comprises instructions to direct the HMD to:
determine a position of a center of the optical element based on the light measurements; and
align the rendering center of the electronic display with the center of the optical element.

10. The HMD of claim 9, wherein the instructions to determine the position of the center of the optical element comprises instructions to direct the HMD to:
determine a first display coordinate of the electronic display that is aligned with the light sensor based on corresponding intensity values of the light measurements; and
determine a second display coordinate of the electronic display that is aligned with the center of the optical element based on the first display coordinate and a calibrated distance between the light sensor and the center of the optical element.

11. The HMD of claim 8, wherein the pixel pattern comprises a single column of pixels, wherein each of the light measurements includes an intensity value measured by the light sensor while the single column of pixels is illuminated at a respective display coordinate of the electronic display.

12. The HMD of claim 8, wherein the pixel pattern comprises multiple columns of pixels, wherein each of the light measurements includes an intensity value measured by the light sensor while the multiple columns of pixels are simultaneously illuminated at a respective display coordinate of the electronic display.

13. The HMD of claim 8, wherein the pixel pattern comprises at least one column of pixels segmented into several groups of pixels, wherein each of the light measurements includes an intensity value measured by the light sensor while the at least one column of pixels is illuminated at a respective display coordinate of the electronic display.

14. One or more non-transitory computer-readable media storing computer-executable instructions, which when executed by at least one processor, direct the processor to:
generate a pixel pattern of display light by an electronic display;
vary a location of the pixel pattern on the electronic display;
generate light measurements with a light sensor while the location of the pixel pattern is varied, wherein the light measurements are representative of a lateral position of an optical element; and
adjust a rendering center of the electronic display for presentation of one or more images with respect to the optical element based on the light measurements, wherein the instructions to adjust the rendering center of the electronic display includes instructions to adjust a location of where the one or more images are to be presented on the electronic display.

15. The one or more non-transitory computer-readable media of claim 14, wherein the instructions to adjust the rendering center of the electronic display comprises instructions to direct the processor to:
determine a position of a center of the optical element based on the light measurements; and
align the rendering center of the electronic display with the center of the optical element.

16. The one or more non-transitory computer-readable media of claim 15, wherein the instructions to determine the position of the center of the optical element comprises instructions to direct the processor to:
determine a first display coordinate of the electronic display that is aligned with the light sensor based on corresponding intensity values of the light measurements; and
determine a second display coordinate of the electronic display that is aligned with the center of the optical element based on the first display coordinate and a calibrated distance between the light sensor and the center of the optical element.

17. The one or more non-transitory computer-readable media of claim 14, wherein the pixel pattern comprises a single column of pixels, wherein each of the light measurements includes an intensity value measured by the light sensor while the single column of pixels is illuminated at a respective display coordinate of the electronic display.

18. The one or more non-transitory computer-readable media of claim 14, wherein the pixel pattern comprises multiple columns of pixels, wherein each of the light measurements includes an intensity value measured by the light sensor while the multiple columns of pixels are simultaneously illuminated at a respective display coordinate of the electronic display.

19. The one or more non-transitory computer-readable media of claim 14, wherein the pixel pattern comprises at least one column of pixels segmented into several groups of pixels, wherein each of the light measurements includes an intensity value measured by the light sensor while the at least one column of pixels is illuminated at a respective display coordinate of the electronic display.

20. The HMD of claim 8, wherein the optical element comprises one or more of a lens, a mirror, a diffuser, a filter, a polarizer, a prism, a window, a beam splitter, or a diffractive element.

* * * * *